(12) United States Patent
Xia et al.

(10) Patent No.: US 7,795,854 B2
(45) Date of Patent: Sep. 14, 2010

(54) VOLTAGE REGULATING CIRCUIT

(75) Inventors: Chun-Hua Xia, Shanghai (CN); Xiao-Ru Wu, Shanghai (CN); Li Zeng, Shanghai (CN); Da-Wei Hu, Shanghai (CN); Shih-Hao Liu, Taipei (TW)

(73) Assignee: Inventec corporation, Taipei (TW)

( * ) Notice: Subject to any disclaimer, the term of this patent is extended or adjusted under 35 U.S.C. 154(b) by 363 days.

(21) Appl. No.: 12/015,917

(22) Filed: Jan. 17, 2008

(65) Prior Publication Data
US 2009/0146627 A1      Jun. 11, 2009

(30) Foreign Application Priority Data
Dec. 5, 2007    (TW) ............................. 96146339 A

(51) Int. Cl.
*G05F 1/40* (2006.01)

(52) U.S. Cl. ...................................... 323/283; 323/222

(58) Field of Classification Search ......... 323/282–290, 323/272, 276, 207, 211; 363/125, 127, 65, 363/87, 124
See application file for complete search history.

(56) References Cited

U.S. PATENT DOCUMENTS
7,030,596 B1 *   4/2006   Salerno et al. ............... 323/282

* cited by examiner

*Primary Examiner*—Rajnikant B Patel
(74) *Attorney, Agent, or Firm*—J.C. Patents

(57) ABSTRACT

A voltage regulating circuit including an error signal generator, a comparator, a switch unit, a low-pass filter and a modulating unit is provided. The error signal generator respectively receives a reference voltage signal and a feedback signal, and generates an error signal. The comparator respectively receives the error signal and a comparing signal, and generates a pulse width modulation signal. The switch unit regulates an input voltage signal to generate an output voltage signal according the pulse width modulation signal. The low-pass filter filters out the high frequency of the output signal and produces the feedback signal. The modulating unit is coupled to the low-pass filter and the error signal generator for regulating a transient voltage of the output voltage signal.

13 Claims, 2 Drawing Sheets

VOLTAGE REGULATING CIRCUIT

CROSS-REFERENCE TO RELATED APPLICATION

This application claims the priority benefit of Taiwan application serial no. 96146339, filed on Dec. 5, 2007. The entirety of the above-mentioned patent application is hereby incorporated by reference herein and made a part of this specification.

BACKGROUND OF THE INVENTION

1. Field of the Invention

The present invention generally relates to a voltage regulating circuit, and more particularly, to a voltage regulating circuit capable of improving the undershoot amplitude of a transient output voltage.

2. Description of Related Art

In a general computer system or a server, a voltage regulating circuit is used for providing an appropriate voltage to the CPU (central processing unit) thereof, and the voltage regulating circuit is usually directly plated on the motherboard thereof. The voltage regulating circuit regulates and provides a required voltage, so that the components on the motherboard are able to run with the obtained feed voltage. In addition, in response to a voltage level demand generated and sent by a sensing processor, the voltage regulating circuit detects a voltage identification pin (VID pin) of a microprocessor so as to provide a constant feed voltage to the microprocessor.

However, for the most computer systems and servers, the enterprise voltage regulator down (EVRD) must satisfy a strict testing specification proposed by Intel Co., wherein the most critical and the hardest demand to meet is the overshoot amplitude and the undershoot amplitude of the output voltage of the EVRD during a transient status of load. To satisfy the aforesaid testing specification, a conventional voltage regulating circuit mostly relies on improving the overshoot amplitude of a transient voltage, which can only lower down the overshoot amplitude of a transient voltage without considering the undershoot amplitude problem of a transient voltage; i.e., the conventional voltage regulating circuit is unable to meet the requirement of undershoot amplitude of a transient voltage, and the computer system or the server employing the conventional voltage regulating circuit has a risk of shutdown during the CPU running at a specific frequency.

SUMMARY OF THE INVENTION

Accordingly, the present invention is directed to voltage regulating circuit for effectively improving the undershoot amplitude of a transient output voltage.

The present invention provides a voltage regulating circuit, which includes an error signal generator, a comparator, a switch unit, a low-pass filter and a modulating unit. The error signal generator has a first input terminal, a second input terminal and an output terminal. The first and second input terminals of the error signal generator respectively receive a reference voltage signal and a feedback signal, and the output terminal thereof outputs an error signal. The comparator has a first input terminal, a second input terminal and an output terminal, wherein the first input terminal receives the error signal, the second input terminal receives a comparing signal, and the output terminal thereof outputs a pulse width modulation signal (PWM signal). The switch unit is coupled to the output terminal of the comparator for regulating an input voltage signal and thereby outputting an output voltage signal according to the PWM signal. The low-pass filter is coupled to the switch unit for filtering the high frequency of the output voltage signal and generating the feedback signal. The modulating unit has a first terminal and a second terminal, wherein the first terminal is coupled to the low-pass filter and the second input terminal of the error signal generator, and the second terminal thereof is coupled to the output terminal of the error signal generator for regulating the transient voltage of the output voltage signal.

In an embodiment of the present invention, the aforesaid voltage regulating circuit further includes a first compensating unit. The first terminal of the first compensating unit is coupled to the second input terminal of the error signal generator, and the second terminal thereof is coupled to the output terminal of the error signal generator for compensating the error signal.

In an embodiment of the present invention, the aforesaid first compensating unit includes a first resistor, a first capacitor and a second capacitor. The first end of the first resistor is coupled to the second input terminal of the error signal generator. The first terminal of the first capacitor is coupled to the second end of the first resistor, and the second terminal thereof is coupled to the output terminal of the error signal generator. The first terminal of the second capacitor is coupled to the first end of the first resistor, and the second terminal thereof is coupled to the second terminal of the first capacitor.

In an embodiment of the present invention, the aforesaid voltage regulating circuit further includes a second compensating unit. The first terminal of the second compensating unit is coupled to the second input terminal of the error signal generator, and the second terminal thereof is coupled to the low-pass filter for compensating the feedback signal.

In an embodiment of the present invention, the aforesaid second compensating unit includes a second resistor, a third resistor, a third capacitor and a fourth resistor. The first end of the second resistor is coupled to the first input terminal of the error signal generator and the second end thereof is coupled to the low-pass filter. The first end of the third resistor is coupled to the first end of the second resistor. The first terminal of the third capacitor is coupled to the second end of the third resistor, and the second terminal thereof is coupled to the second end of the second resistor. The first end of the fourth resistor is coupled to the first end of the second resistor and the second end of the fourth resistor is coupled to a ground terminal.

In an embodiment of the present invention, the aforesaid switch unit includes a first transistor, an inverter and a second transistor. The gate terminal of the first transistor is coupled to the output terminal of the comparator and the first source/drain terminal thereof is coupled to the input voltage signal. The input terminal of the inverter receives the PWM signal. The gate terminal of the second transistor is coupled to the output terminal of the inverter, the first source/drain terminal of the second transistor is coupled to the second source/drain terminal of the first transistor and the second source/drain terminal of the second transistor is coupled to the ground terminal.

In an embodiment of the present invention, the aforesaid switch unit further includes a buffer, a first diode and a second diode. The buffer is coupled between the output terminal of the comparator and the gate terminal of the first transistor for gaining the PWM signal. The anode terminal of the first diode is coupled to the second source/drain terminal of the first transistor and the cathode terminal thereof is coupled to the first source/drain terminal of the first transistor. The anode terminal of the second diode is coupled to the second source/drain terminal of the second transistor and the cathode terminal thereof is coupled to the first source/drain terminal of the second transistor.

In an embodiment of the present invention, the aforesaid low-pass filter includes an inductor and a fourth capacitor. The first end of the inductor is coupled to the switch unit. The first terminal of the fourth capacitor is coupled to the second end of the inductor and the second terminal thereof is coupled to the ground terminal.

In an embodiment of the present invention, the aforesaid modulating unit includes a fifth resistor, a third diode and a fifth capacitor. The first end of the fifth resistor is coupled to the second input terminal of the error signal generator. The anode terminal of the third diode is coupled to the second end of the fifth resistor and the cathode terminal thereof is coupled to the output terminal of the error signal generator. The first terminal of the fifth capacitor is coupled to the anode terminal of the third diode and the second terminal thereof is coupled to the ground terminal. In another embodiment, the aforesaid comparing signal is triangle wave signal or serrated wave signal.

Furthermore, the present invention includes a modulating circuit provided between the error signal and the feedback signal so as to effectively overcome the problems that an error signal suddenly falls and a considerable undershoot amplitude occurs via an output voltage surging (i.e. by a transient voltage).

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
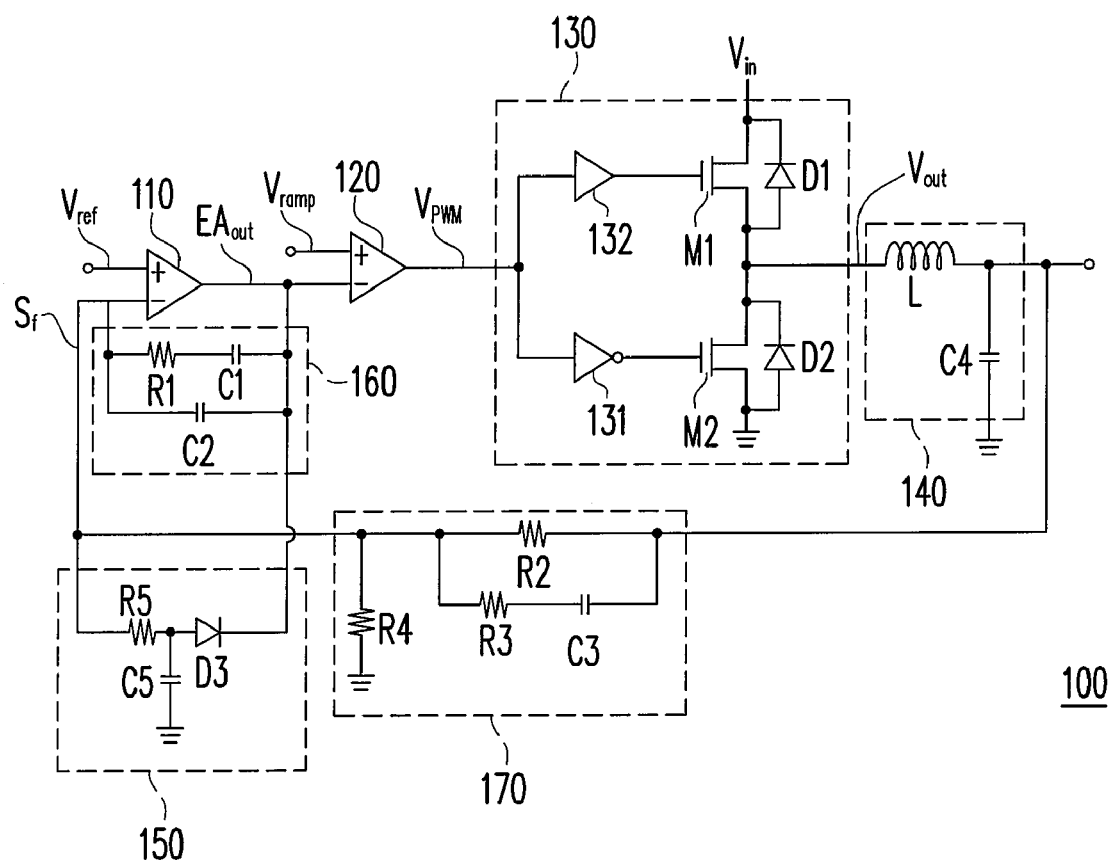
FIG. 1 is a diagram of a voltage regulating circuit according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram of a voltage regulating circuit according to an embodiment of the present invention. Referring to FIG. 1, a voltage regulating circuit 100 includes an error signal generator 110, a comparator 120, a switch unit 130, a low-pass filter 140 and a modulating unit 150. The error signal generator 110 has a first input terminal (for example, a positive input terminal), a second input terminal (for example, a negative terminal) and an output terminal. The first and second input terminals of the error signal generator 110 respectively receive a reference voltage signal $V_{ref}$ and a feedback signal $S_f$, and the output terminal thereof outputs an error signal $EA_{OUT}$.

The comparator 120 has a first input terminal (for example, a positive terminal), a second input terminal (for example, a negative terminal) and an output terminal, wherein the first input terminal of the comparator 120 receives the error signal $EA_{OUT}$, the second input terminal receives a comparing signal $V_{ramp}$, and the output terminal thereof generates a PWM signal $V_{PWM}$. In the embodiment, the comparing signal $V_{ramp}$ is, for example, triangle wave signal or serrated wave signal.

The switch unit 130 is coupled to the output terminal of the comparator 120 for regulating an input voltage signal $V_{in}$ and thereby generating an output voltage signal $V_{out}$ according to the PWM signal $V_{PWM}$. The low-pass filter 140 is coupled to the switch unit 130 for filtering the high frequency of the output voltage signal $V_{out}$ and generating the feedback signal $S_f$. The modulating unit 150 has a first terminal and a second terminal, wherein the first terminal is coupled to the low-pass filter 140 and the second input terminal of the error signal generator 110, and the second terminal thereof is coupled to the output terminal of the error signal generator 110 for regulating the transient voltage of the output voltage signal $V_{out}$.

In the embodiment, the aforesaid voltage regulating circuit 100 further includes a first compensating unit 160 and a second compensating unit 170. The first terminal of the first compensating unit 160 is coupled to the second input terminal of the error signal generator 110, and the second terminal of the first compensating unit 160 is coupled to the output terminal of the error signal generator 110 for compensating the error signal $EA_{OUT}$. The first terminal of the second compensating unit 170 is coupled to the second input terminal of the error signal generator 110, and the second terminal of the second compensating unit 170 is coupled to the low-pass filter 140 for compensating the feedback signal $S_f$.

Further refer FIG. 1, the first compensating unit 160 includes a resistor R1, capacitors C1 and C2. The first end of the first resistor R1 is coupled to the second input terminal of the error signal generator 110. The first terminal of the capacitor C1 is coupled to the second end of the resistor R1, and the second terminal thereof is coupled to the output terminal of the error signal generator 110. The first terminal of the capacitor C2 is coupled to the first end of the resistor R1, and the second terminal thereof is coupled to the second terminal of the capacitor C1.

The second compensating unit 170 includes resistors R2, R3 and R4, a capacitor C3. The first end of the resistor R2 is coupled to the first input terminal of the error signal generator 110 and the second end thereof is coupled to the low-pass filter 140. The first end of the resistor R3 is coupled to the first end of the resistor R2. The first terminal of the capacitor C3 is coupled to the second end of the resistor R3, and the second terminal thereof is coupled to the second end of the resistor R2. The first end of the resistor R4 is coupled to the first end of the resistor R2 and the second end of the resistor R4 is coupled to a ground terminal GND.

In terms of the overall operation of the voltage regulating circuit 100, when the output voltage signal $V_{out}$ surges (i.e. generating a transient voltage), the voltage level of the feedback signal $S_f$ is accordingly increased and therefore, the voltage level of the error signal $EA_{OUT}$ suddenly falls to operate the modulating unit 150, so as to slow down the voltage falling rate of the error signal $EA_{OUT}$ to avoid an excessive undershoot amplitude. The variation of the error signal $EA_{OUT}$ directly affects the voltage level of the output voltage signal $V_{out}$. Therefore, the voltage regulating circuit 100 is able to produce a relatively accurate output voltage signal $V_{out}$ by improving the undershoot amplitude of the error signal $EA_{OUT}$, which avoids the circuit from a fault action which may cause the shutdown of the computer system.

In order to make anyone skilled in the art better understand the spirit of the present invention, the internal structures of the switch unit 130, the low-pass filter 140 and the modulating unit 150 are depicted hereinafter.

Further refer FIG. 1, the switch unit 130 includes transistors M1 and M2 and an inverter 131. The gate terminal of the transistor M1 is coupled to the output terminal of the comparator 120 and the first source/drain terminal thereof is coupled to the input voltage signal $V_{in}$. The input terminal of the inverter 131 receives the PWM signal $V_{PWM}$. The gate terminal of the transistor M2 is coupled to the output terminal of the inverter 131, the first source/drain terminal of the transistor M2 is coupled to the second source/drain terminal of the transistor M1 and the second source/drain terminal of the transistor M2 is coupled to the ground terminal GND.

In addition, the switch unit 130 further includes a buffer 132, diodes D1 and D2. The buffer 132 is coupled between the output terminal of the comparator 120 and the gate terminal of the transistor M1 for gaining the PWM signal $V_{PWM}$. The anode terminal of the diode D1 is coupled to the second source/drain terminal of the transistor M1 and the cathode terminal thereof is coupled to the first source/drain terminal of the transistor M1. The anode terminal of the diode D2 is coupled to the second source/drain terminal of the transistor M2 and the cathode terminal thereof is coupled to the first source/drain terminal of the transistor M2. The diodes D1 and D2 herein are mainly for respectively suppressing the voltages across the two terminals of the transistors M1 and M2.

The low-pass filter 140 includes an inductor L and a capacitor C4. The first end of the inductor L is coupled to the switch unit 130. The first terminal of the capacitor C4 is coupled to the second end of the inductor L and the second terminal thereof is coupled to the ground terminal GND. The modulating unit 150 includes a resistor R5, a diode D3 and a capacitor C5. The first end of the resistor R5 is coupled to the second input terminal of the error signal generator 110. The anode terminal of the diode D3 is coupled to the second end of the resistor R5 and the cathode terminal thereof is coupled to the output terminal of the error signal generator 110. The first terminal of the capacitor C5 is coupled to the anode terminal of the diode C3 and the second terminal thereof is coupled to the ground terminal GND.

Figure 2:
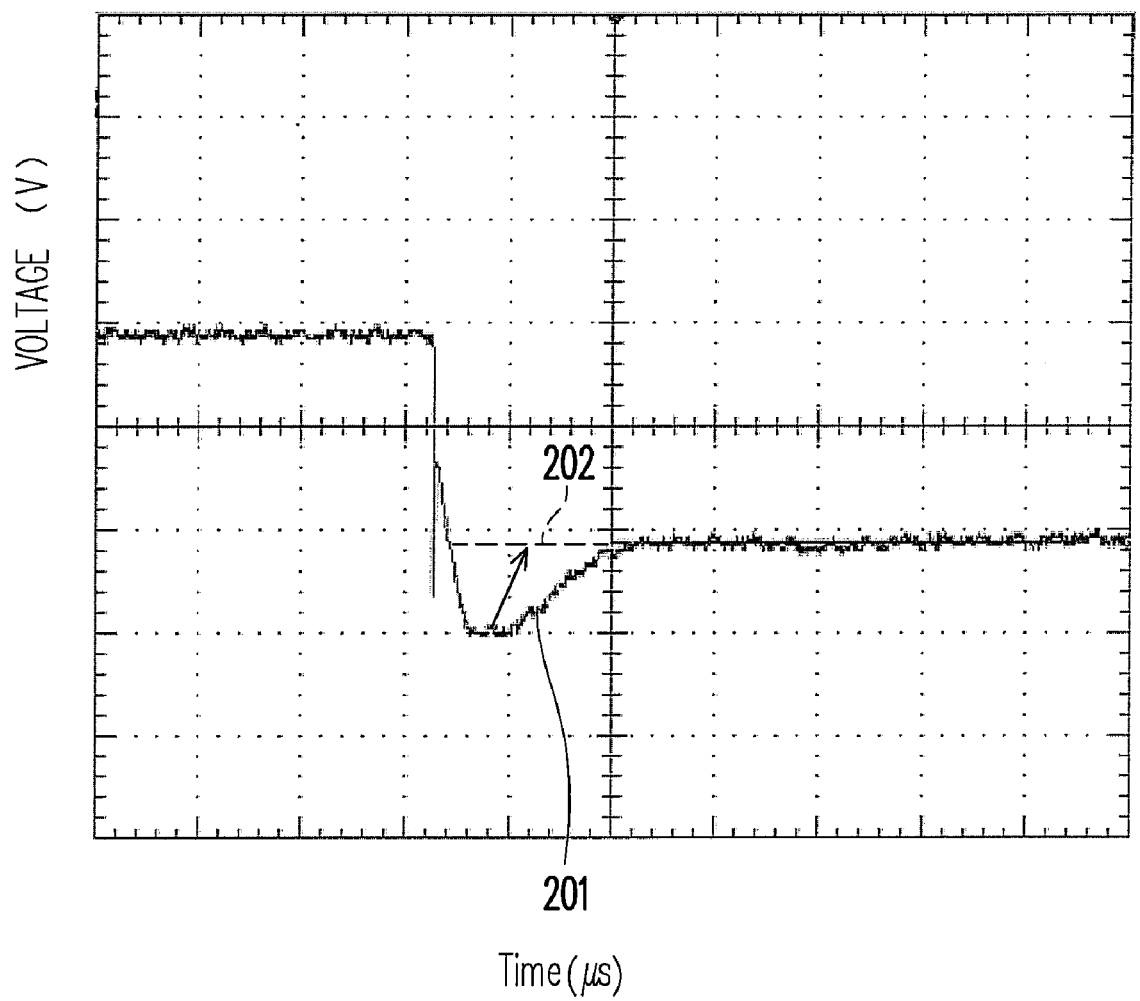
FIG. 2 is a graph of two measured error signals of a voltage regulating circuit with a modulating circuit and without a modulating circuit.

FIG. 2 is a graph of two measured error signals of a voltage regulating circuit with a modulating circuit and without a modulating circuit. Referring to FIGS. 1 and 2, the curve 201 herein is corresponding to the measured error signal $EA_{OUT}$ of a voltage regulating circuit without the modulating circuit 150 in FIG. 1. The curve 202 herein is corresponding to the measured error signal $EA_{OUT}$ of a voltage regulating circuit of the present invention with the modulating circuit 150 in FIG. 1. In correspondence with the trend of the curves 201 and 202, the voltage of the error signal $EA_{OUT}$ (i.e. transient voltage) in the voltage regulating circuit 100 without the modulating unit 150 would produce a considerable undershoot amplitude; in contrast, the voltage of the error signal $EA_{OUT}$ (i.e. transient voltage) in the voltage regulating circuit 100 of FIG. 1 with the modulating unit 150 would be changed and the curve 201 is turned into the curve 202. That is to say, the modulating unit 150 of the present invention in FIG. 1 is able to effectively improve the undershoot amplitude of the transient voltage of the output voltage signal $V_{out}$, which avoids the voltage regulating circuit 100 from providing a wrong voltage to cause the computer shutdown when the undershoot amplitude of a transient voltage is excessive.

In summary, the present invention includes a modulating circuit provided between the error signal and the feedback signal so as to effectively overcome the problems that an error signal suddenly falls and a considerable undershoot amplitude occurs via an output voltage surging (i.e. by a transient voltage). In this way, the present invention is able to prevent a computer system or a server during running at a specific frequency from shutdown.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A voltage regulating circuit, comprising:
    an error signal generator, having a first input terminal, a second input terminal and an output terminal, wherein the first input terminal and the second input terminal of the error signal generator respectively receive a reference voltage signal and a feedback signal, and the output terminal of the error signal generator outputs an error signal;
    a comparator, having a first input terminal, a second input terminal and an output terminal, wherein the first input terminal receives the error signal, the second input terminal receives a comparing signal, and the output terminal thereof generates a pulse width modulation signal;
    a switch unit, coupled to the output terminal of the comparator for regulating an input voltage signal and thereby generating an output voltage signal according to the pulse width modulation signal;
    a low-pass filter, coupled to the switch unit for filtering the high frequency of the output voltage signal and generating the feedback signal;
    a modulating unit, having a first terminal and a second terminal, wherein the first terminal of the modulating unit is coupled to the low-pass filter and the second input terminal of the error signal generator, and the second terminal of the modulating unit is coupled to the output terminal of the error signal generator for regulating the transient voltage of the output voltage signal; and
    a first compensating unit, having a first terminal and a second terminal, wherein the first terminal is coupled to the second input terminal of the error signal generator, and the second terminal thereof is coupled to the output terminal of the error signal generator for compensating the error signal,
    wherein the first compensating unit comprises:
    a first resistor, having a first end and a second end, wherein the first end is coupled to the second input terminal of the error signal generator;
    a first capacitor, having a first terminal and a second terminal, wherein the first terminal is coupled to the second end of the first resistor, and the second terminal thereof is coupled to the output terminal of the error signal generator; and
    a second capacitor, having a first terminal and a second terminal, wherein the first terminal is coupled to the first end of the first resistor, and the second terminal thereof is coupled to the second terminal of the first capacitor.

2. A voltage regulating circuit, comprising:
    an error signal generator, having a first input terminal, a second input terminal and an output terminal, wherein the first input terminal and the second input terminal of the error signal generator respectively receive a reference voltage signal and a feedback signal, and the output terminal of the error signal generator outputs an error signal;
    a comparator, having a first input terminal, a second input terminal and an output terminal, wherein the first input terminal receives the error signal, the second input terminal receives a comparing signal, and the output terminal thereof generates a pulse width modulation signal;

a switch unit, coupled to the output terminal of the comparator for regulating an input voltage signal and thereby generating an output voltage signal according to the pulse width modulation signal;

a low-pass filter, coupled to the switch unit for filtering the high frequency of the output voltage signal and generating the feedback signal;

a modulating unit, having a first terminal and a second terminal, wherein the first terminal of the modulating unit is coupled to the low-pass filter and the second input terminal of the error signal generator, and the second terminal of the modulating unit is coupled to the output terminal of the error signal generator for regulating the transient voltage of the output voltage signal; and a second compensating unit, having a first terminal and a second terminal, wherein the first terminal is coupled to the second input terminal of the error signal generator and the second terminal thereof is coupled to the low-pass filter for compensating the feedback signal.

3. The voltage regulating circuit according to claim 2, wherein the second compensating unit comprises:

a second resistor, having a first end and a second end, wherein the first end is coupled to the first input terminal of the error signal generator and the second end thereof is coupled to the low-pass filter;

a third resistor, having a first end and a second end, wherein the first end is coupled to the first end of the second resistor;

a third capacitor, having a first terminal and a second terminal, wherein the first terminal is coupled to the second end of the third resistor, and the second terminal thereof is coupled to the second end of the second resistor; and a fourth resistor, having a first end and a second end, wherein the first end is coupled to the first end of the second resistor and the second end thereof is coupled to a ground terminal.

4. The voltage regulating circuit according to claim 1, wherein the switch unit comprises:

a first transistor, having a gate terminal, a first source/drain terminal and a second source/drain terminal, wherein the gate terminal is coupled to the output terminal of the comparator and the first source/drain terminal thereof is coupled to the input voltage signal;

an inverter, having an input terminal, wherein the input terminal receives the pulse width modulation signal; and a second transistor, having a gate terminal, a first source/drain terminal and a second source/drain terminal, wherein the gate terminal is coupled to the output terminal of the inverter, the first source/drain terminal is coupled to the second source/drain terminal of the first transistor and the second source/drain terminal thereof is coupled to the ground terminal.

5. The voltage regulating circuit according to claim 4, wherein the switch unit further comprises:

a buffer, coupled between the output terminal of the comparator and the gate terminal of the first transistor for gaining the pulse width modulation signal;

a first diode, having an anode terminal and a cathode terminal, wherein the anode terminal is coupled to the second source/drain terminal of the first transistor and the cathode terminal thereof is coupled to the first source/drain terminal of the first transistor; and a second diode, having an anode terminal and a cathode terminal, wherein the anode terminal of the second diode is coupled to the second source/drain terminal of the second transistor and the cathode terminal thereof is coupled to the first source/drain terminal of the second transistor.

6. The voltage regulating circuit according to claim 1, wherein the low-pass filter comprises:

an inductor, having a first end and a second end, wherein the first end is coupled to the switch unit; and a fourth capacitor, having a first terminal and a second terminal, wherein the first terminal is coupled to the second end of the inductor and the second terminal thereof is coupled to the ground terminal.

7. The voltage regulating circuit according to claim 1, wherein the modulating unit comprises:

a fifth resistor, having a first end and a second end, wherein the first end is coupled to the second input terminal of the error signal generator;

a third diode, having an anode terminal and a cathode terminal, wherein the anode terminal is coupled to the second end of the fifth resistor and the cathode terminal thereof is coupled to the output terminal of the error signal generator; and a fifth capacitor, having a first terminal and a second terminal, wherein the first terminal is coupled to the anode terminal of the third diode and the second terminal thereof is coupled to the ground terminal.

8. The voltage regulating circuit according to claim 1, wherein the comparing signal is a triangle wave signal or a serrated wave signal.

9. The voltage regulating circuit according to claim 2, wherein the switch unit comprises:

a first transistor, having a gate terminal, a first source/drain terminal and a second source/drain terminal, wherein the gate terminal is coupled to the output terminal of the comparator and the first source/drain terminal thereof is coupled to the input voltage signal;

an inverter, having an input terminal, wherein the input terminal receives the pulse width modulation signal; and a second transistor, having a gate terminal, a first source/drain terminal and a second source/drain terminal, wherein the gate terminal is coupled to the output terminal of the inverter, the first source/drain terminal is coupled to the second source/drain terminal of the first transistor and the second source/drain terminal thereof is coupled to the ground terminal.

10. The voltage regulating circuit according to claim 9, wherein the switch unit further comprises:

a buffer, coupled between the output terminal of the comparator and the gate terminal of the first transistor for gaining the pulse width modulation signal;

a first diode, having an anode terminal and a cathode terminal, wherein the anode terminal is coupled to the second source/drain terminal of the first transistor and the cathode terminal thereof is coupled to the first source/drain terminal of the first transistor; and a second diode, having an anode terminal and a cathode terminal, wherein the anode terminal of the second diode is coupled to the second source/drain terminal of the second transistor and the cathode terminal thereof is coupled to the first source/drain terminal of the second transistor.

11. The voltage regulating circuit according to claim 2, wherein the low-pass filter comprises:

an inductor, having a first end and a second end, wherein the first end is coupled to the switch unit; and a fourth capacitor, having a first terminal and a second terminal, wherein the first terminal is coupled to the second end of the inductor and the second terminal thereof is coupled to the ground terminal.

12. The voltage regulating circuit according to claim 2, wherein the modulating unit comprises:

a fifth resistor, having a first end and a second end, wherein the first end is coupled to the second input terminal of the error signal generator;

a third diode, having an anode terminal and a cathode terminal, wherein the anode terminal is coupled to the second end of the fifth resistor and the cathode terminal thereof is coupled to the output terminal of the error signal generator; and a fifth capacitor, having a first terminal and a second terminal, wherein the first terminal is coupled to the anode terminal of the third diode and the second terminal thereof is coupled to the ground terminal.

13. The voltage regulating circuit according to claim 2, wherein the comparing signal is a triangle wave signal or a serrated wave signal.

* * * * *